United States Patent
Lee et al.

(10) Patent No.: US 11,949,502 B2
(45) Date of Patent: Apr. 2, 2024

(54) METHOD FOR DETERMINING MCS INDEX TABLE IN WIRELESS COMMUNICATION SYSTEM, AND APPARATUS THEREFOR

(71) Applicant: Samsung Electronics Co., Ltd., Suwon-si (KR)

(72) Inventors: Keonyoung Lee, Suwon-si (KR); Sangwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 17/292,860

(22) PCT Filed: Nov. 5, 2019

(86) PCT No.: PCT/KR2019/014912
§ 371 (c)(1),
(2) Date: May 11, 2021

(87) PCT Pub. No.: WO2020/101245
PCT Pub. Date: May 22, 2020

(65) Prior Publication Data
US 2021/0399826 A1    Dec. 23, 2021

(30) Foreign Application Priority Data
Nov. 16, 2018    (KR) .................... 10-2018-0141488

(51) Int. Cl.
*H04L 1/00*    (2006.01)
*H04B 7/06*    (2006.01)
*H04W 72/23*    (2023.01)

(52) U.S. Cl.
CPC ......... *H04L 1/0003* (2013.01); *H04B 7/0626* (2013.01); *H04L 1/0016* (2013.01); *H04W 72/23* (2023.01)

(58) Field of Classification Search
CPC ..... H04W 76/25; H04W 80/10; H04W 76/30; H04W 4/80; H04W 8/12; H04W 92/02;
(Continued)

(56) References Cited

U.S. PATENT DOCUMENTS

2010/0150096 A1    6/2010   Choi et al.
2013/0258968 A1    10/2013  Hong et al.
(Continued)

FOREIGN PATENT DOCUMENTS

EP         2 787 670 A1     10/2014
KR    10-2010-0069539 A     6/2010
(Continued)

*Primary Examiner* — Kwasi Karikari
(74) *Attorney, Agent, or Firm* — Jefferson IP Law, LLP

(57) ABSTRACT

Disclosed in various embodiments of the present invention are: an apparatus using a modulation and coding scheme (MCS) index table in a wireless communication system; an MCS index table determination method therefor; and an apparatus therefor. According to various embodiments of the present invention, an electronic device comprises at least one communication circuit for supporting wireless communication with a base station, a memory for storing at least two MCS index tables, and a processor operatively connected to the communication circuit and the memory, wherein the processor receives downlink control information (DCI), which includes a retransmission MCS index so as to be retransmitted from the base station, by using the communication circuit when a cyclic redundancy check (CRC) fails, compares same with the retransmission MCS index stored in the memory, on the basis of the retransmission MCS index of the downlink control information, determines a mismatch between the MCS index tables on the basis of determining that the retransmission MCX indexes differ, and restores the MCS index table on the basis of (Continued)

determining the mismatch between the MCS index tables. Additional various embodiments are possible.

15 Claims, 11 Drawing Sheets

(58) Field of Classification Search
CPC ..... H04W 76/10; H04W 36/08; H04W 48/18; H04W 48/20; H04W 52/0251; H04W 52/223; H04W 52/40; H04W 76/32; H04W 24/02; H04W 36/04; H04W 36/14
See application file for complete search history.

(56) References Cited

U.S. PATENT DOCUMENTS

| | | |
|---|---|---|
| 2014/0198677 A1 | 7/2014 | Xu et al. |
| 2015/0200746 A1 | 7/2015 | Pan et al. |
| 2015/0271794 A1* | 9/2015 | Kang .................... H04L 1/0003 370/329 |
| 2015/0271802 A1* | 9/2015 | Kang .................... H04L 1/0003 370/329 |
| 2016/0036618 A1 | 2/2016 | Einhaus et al. |
| 2017/0033950 A1 | 2/2017 | Houghton et al. |
| 2017/0111202 A1 | 4/2017 | Kim et al. |
| 2017/0295593 A1 | 10/2017 | Kim et al. |
| 2018/0227884 A1 | 8/2018 | Kim et al. |
| 2021/0144738 A1* | 5/2021 | Yoshioka .............. H04L 5/0094 |

FOREIGN PATENT DOCUMENTS

| | | |
|---|---|---|
| KR | 10-2013-0109414 A | 10/2013 |
| KR | 10-2015-0034808 A | 4/2015 |
| KR | 10-2015-0107789 A | 9/2015 |
| KR | 10-2015-0111819 A | 10/2015 |
| KR | 10-2016-0111681 A | 9/2016 |

\* cited by examiner

FIG. 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG. 3

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | |
| 30 | 6 | |
| 31 | 8 | |

FIG. 4

| CQI index | modulation scheme | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

FIG. 7

| Modulation and TBS table (Normal CQI) | | | |
|---|---|---|---|
| MCS Index | Modulation Order | TBX Index | Re-Tx MCS |
| 0 | 2 | 0 | 29 |
| 1 | 2 | 1 | 29 |
| 2 | 2 | 2 | 29 |
| 3 | 2 | 3 | 29 |
| 4 | 2 | 4 | 29 |
| 5 | 2 | 5 | 29 |
| 6 | 2 | 6 | 29 |
| 7 | 2 | 7 | 29 |
| 8 | 2 | 8 | 29 |
| 9 | 2 | 9 | 29 |
| 10 | 4 | 9 | 30 |
| 11 | 4 | 10 | 30 |
| 12 | 4 | 11 | 30 |
| 13 | 4 | 12 | 30 |
| 14 | 4 | 13 | 30 |
| 15 | 4 | 14 | 30 |
| 16 | 4 | 15 | 30 |
| 17 | 6 | 15 | 31 |
| 18 | 6 | 16 | 31 |
| 19 | 6 | 17 | 31 |
| 20 | 6 | 18 | 31 |
| 21 | 6 | 19 | 31 |
| 22 | 6 | 20 | 31 |
| 23 | 6 | 21 | 31 |
| 24 | 6 | 22 | 31 |
| 25 | 6 | 23 | 31 |
| 26 | 6 | 24 | 31 |
| 27 | 6 | 25 | 31 |
| 28 | 6 | 26/26A | 31 |
| 29 | 2 | reserved | |
| 30 | 4 | | |
| 31 | 6 | | |

700

710 (MCS Index 0–4)
720 (MCS Index 10)
730 (MCS Index 17–19)

FIG. 8

| Modulation and TBS table 2 (ALT CQI) | | | |
|---|---|---|---|
| MCS Index | Modulation Order | TBX Index | Re-Tx MCS |
| 0 | 2 | 0 | 28 |
| 1 | 2 | 2 | 28 |
| 2 | 2 | 4 | 28 |
| 3 | 2 | 6 | 28 |
| 4 | 2 | 8 | 28 |
| 5 | 2 | 10 | 29 |
| 6 | 2 | 11 | 29 |
| 7 | 2 | 12 | 29 |
| 8 | 2 | 13 | 29 |
| 9 | 2 | 14 | 29 |
| 10 | 4 | 15 | 29 |
| 11 | 4 | 16 | 30 |
| 12 | 4 | 17 | 30 |
| 13 | 4 | 18 | 30 |
| 14 | 4 | 19 | 30 |
| 15 | 4 | 20 | 30 |
| 16 | 4 | 21 | 30 |
| 17 | 6 | 22 | 30 |
| 18 | 6 | 23 | 30 |
| 19 | 6 | 24 | 30 |
| 20 | 6 | 25 | 31 |
| 21 | 6 | 27 | 31 |
| 22 | 6 | 28 | 31 |
| 23 | 6 | 29 | 31 |
| 24 | 6 | 30 | 31 |
| 25 | 6 | 31 | 31 |
| 26 | 6 | 32 | 31 |
| 27 | 6 | 33/ 33A/ 33B | 31 |
| 28 | 6 | reserved | 31 |
| 29 | 2 | reserved | |
| 30 | 4 | reserved | |
| 31 | 6 | reserved | |

METHOD FOR DETERMINING MCS INDEX TABLE IN WIRELESS COMMUNICATION SYSTEM, AND APPARATUS THEREFOR

TECHNICAL FIELD

Various embodiments disclose a device using a modulation and coding scheme (MCS) index table in a wireless communication system, a method of determining an MCS index table thereof, and a device therefor.

BACKGROUND ART

Converting signal (or information) intensity, displacement, frequency, or phase in signal information to an appropriate waveform shape to correspond to channel characteristics of a transmission medium is referred to as modulation. Further, converting a digital signal (e.g., digital symbol string) to be transmitted to a signal corresponding to channel characteristics to correspond digital information to one of several possible signals (or a set of signals) is referred to as digital modulation. As a representative digital modulation scheme with good bandwidth efficiency, an M-ary QAM modulation scheme represented as 2MQAM (e.g., M is a modulation order) such as quadrature phase shift keying (QPSK) (or 4 quadrature amplitude modulation (QAM)), 16QAM, or 64QAM may be used.

For example, in a wireless communication system such as long term evolution (LTE), LTE-Advanced, or next-generation mobile communication (e.g., 5G new radio (NR)), a modulation scheme used for downlink (DL) data transmission may include QPSK, 16QAM, or 64QAM. Using such a modulation scheme, a base station may transmit data (or signal) to a terminal, and the terminal may receive and demodulate the transmitted data.

However, nowadays, because of the explosive increase in the number of terminals and the increase in data usage, an amount of data transmission and reception between the terminal and the base station is increasing, and there is increasing a demand for a modulation scheme capable of processing a large amount of data traffic at a high speed.

The base station selects one of various modulation schemes in consideration of a downlink channel condition, and notifies the terminal of the modulation scheme using downlink control information (DCI). The terminal may identify the received DCI and receive data through demodulation suitable for a data modulation scheme.

To this end, the terminal may measure a downlink channel condition and transmit information on the measured channel condition to the base station. Further, the base station may include modulation and coding scheme (MCS) index information mapped to QPSK, 16QAM, and 64QAM, respectively, in DCI and transmit the information to the terminal. However, a new modulation scheme is required because of the above-described increase in data traffic and increase in speed. To this end, in recent wireless communication systems, 256QAM is defined as a modulation scheme.

As 256QAM is newly defined as a modulation scheme in the wireless communication system, the base station and the terminal may store an MCS index table including modulation schemes of QPSK, 16QAM, 64QAM, and 256QAM in addition to an MCS index table including modulation schemes of QPSK, 16QAM, and 64QAM. Accordingly, there may occur a case of using different MCS index tables between the base station and the terminal (e.g., MCS index table mismatch). In this way, when different MCS index tables are used between the base station and the terminal, demodulation of data (or signals) transmitted from the base station to the terminal may all fail. For example, when different MCS index tables are used between the base station and the terminal, the terminal continuously fails to decode a physical downlink shared channel (PDSCH); thus, data communication may be impossible. Accordingly, when an MCS index table mismatch occurs between the base station and the terminal in a wireless communication system, there is a need for a method of recovering (or matching) the MCS index table by detecting the mismatch.

DISCLOSURE OF INVENTION

Technical Problem

In various embodiments, a device using a modulation and coding scheme (MCS) index table in a wireless communication system, a method of determining an MCS index table thereof, and a device therefor are disclosed.

In various embodiments, in a wireless communication system using at least two MCS index tables (e.g., first MCS index table and second MCS index table) including different modulation schemes, a method for detecting a mismatch in MCS index tables used between a base station and a terminal and a device for the same are disclosed.

In various embodiments, when a mismatch occurs in the MCS index table using different MCS index tables between the base station and the terminal, a method for detecting and recovering the mismatch in the terminal, and a device therefor are disclosed.

In various embodiments, a method for detecting a mismatch in MCS index tables in a terminal and recovering (or matching) a mismatch in MCS index tables in the terminal or a base station, and a device therefor are disclosed.

Solution to Problem

According to various embodiments of the disclosure, an electronic device includes at least one communication circuit configured to support wireless communication with a base station; a memory configured to store at least two modulation and coding scheme (MCS) index tables; and a processor operatively connected to the communication circuit and the memory, wherein the processor is configured to receive retransmitted downlink control information (DCI) including a retransmission MCS index from the base station using the communication circuit when a cyclic redundancy check (CRC) failure occurs, to compare the retransmission MCS index with the retransmission MCS index stored in the memory based on the retransmission MCS index of the DCI, to determine a mismatch in the MCS index tables based on determining that the retransmission MCS indexes are different, and to recover the MCS index table based on determining the mismatch in the MCS index table.

According to various embodiments of the disclosure, a method of operating an electronic device includes receiving, when a cyclic redundancy check (CRC) failure occurs, retransmitted downlink control information (DCI) including a retransmission modulation and coding scheme (MCS) index from a base station using a communication circuit; comparing the retransmission MCS index with a retransmission MCS index stored in a memory based on the retransmission MCS index of the DCI; determining a mismatch in the MCS index tables based on determining that the retransmission MCS indexes are different; and restoring the MCS index table based on determining the mismatch in the MCS index tables.

In various embodiments, a computer readable recording medium on which a program for executing the method in a processor is stored may be included.

Advantageous Effects of Invention

According to an electronic device according to various embodiments and a method of operation the same, in a wireless communication system using at least two MCS index tables (e.g., at least two MCS index tables of a plurality of different MCS index tables such as a first MCS index table, a second MCS index table, or a third MCS index table) including different modulation schemes, when a mismatch in the MCS index tables occurs using different MCS index tables between the base station and the terminal, the terminal can detect and recover the mismatch. Thereby, according to various embodiments, it is possible to prevent a continuous problem from occurring in communication using the same MCS index table again between the base station and the terminal.

According to various embodiments, when a mismatch in MCS index tables is detected in the terminal, by enabling to recover (or match) the MCS index table mismatch in the terminal or the base station, a normal service can be enabled. According to various embodiments, in a wireless communication system, even when a new modulation scheme is newly defined and thus a new MCS index table is added, a mismatch in the MCS index tables can be detected and recovered.

BRIEF DESCRIPTION OF DRAWINGS

FIG. 2 is a diagram illustrating an example of an MCS index table used in a wireless communication system according to various embodiments.

FIG. 3 is a diagram illustrating an example of an MCS index table used in a wireless communication system according to various embodiments.

FIG. 4 is a diagram illustrating an example of a CQI index table used in a wireless communication system according to various embodiments.

FIG. 7 is a diagram illustrating an example of an operation of detecting a mismatch in MCS index tables in an electronic device according to various embodiments.

FIG. 8 is a diagram illustrating an example of an operation of detecting a mismatch in MCS index tables in an electronic device according to various embodiments.

MODE FOR THE INVENTION

Figure 1:
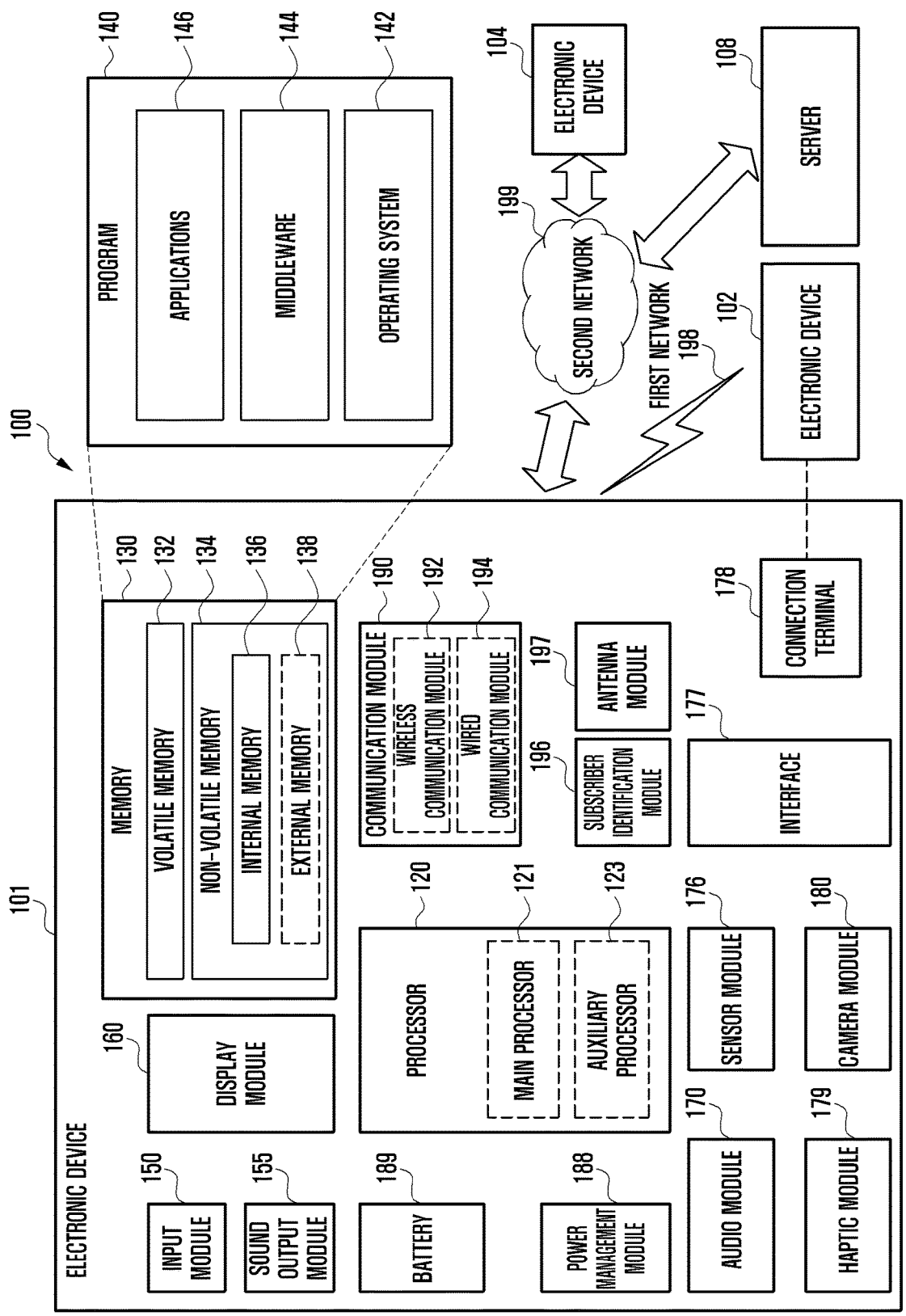
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In various embodiments, a wireless communication system is a system capable of providing various communication services such as voice and packet data and may include, for example, a wireless communication system such as long term evolution (LTE), LTE-Advanced, or next-generation mobile communication (e.g., 5G new radio (NR)). According to various embodiments, the wireless communication system is not limited thereto, and may include various wireless communication systems using at least two modulation and coding scheme (MCS) index tables including different modulation schemes (e.g., at least two MCS index tables of a plurality of other MCS index tables such as a first MCS index table, a second an MCS index table, or a third MCS index table).

In various embodiments, the wireless communication system may include an electronic device 101 and a base station (BS), or an evolved Node-B (eNB)). In various embodiments, the electronic device 101 is a comprehensive concept that refers to a terminal in wireless communication, and may include a user terminal (UE) in wideband code division multiple access (WCDMA), LTE, or high speed packet data access (HSPA) as well as a mobile station (MS), a user terminal (UT), a subscriber station (SS), or a wireless device in a global system for mobile communications (GSM).

In various embodiments, a base station, a cell, or a network represents a station communicating with the electronic device 101, and may be referred to as other terms such as a Node-B, eNB, sector, site, base transceiver system (BTS), access point (AP), relay node, remote radio head (RRH), radio unit (RU), or small cell. For example, in various embodiments, a base station, cell, or network refers to a comprehensive concept representing a base station controller (BSC) in CDMA, a Node-B in WCDMA, an eNB in LTE, or a partial area or function covered by a sector (or site), and may mean covering all of various coverage areas such as a communication range of a mega cell, macro cell, micro cell, pico cell, remto cell, relay node, RRH, RU, or small cell.

In various embodiments of the present specification, the electronic device 101 (or user terminal) and the base station are used in a comprehensive sense as two transmission and reception (e.g., uplink (UL) or downlink (DL)) subjects used for implementing the technology or technical idea described in the present specification and is not limited by a specific term or word. Here, the uplink may refer to a method of transmitting and receiving data to the base station by the electronic device 101, and the downlink may refer to a method of transmitting and receiving data to the electronic device 101 by the base station.

In various embodiments, multiple access techniques applied to the wireless communication system may use various multiple access techniques such as code division multiple access (CDMA), time division multiple access (TDMA), frequency division multiple access (FDMA), orthogonal frequency division multiple access (OFDMA), OFDM-FDMA, OFDM-TDMA, or OFDM-CDMA. According to various embodiments, multiple access techniques may be applied to resource allocation in asynchronous wireless communication evolving to LTE and LTE-Advanced through GSM, WCDMA, and HSPA, and synchronous wireless communication evolving to CDMA, CDMA-2000 and UMB. Various embodiments should not be limited or construed as being limited to a specific wireless communication field, but should be construed as including all technical fields to which the spirit of the various embodiments may be applied.

In various embodiments, uplink transmission and downlink transmission may use a time division duplex (TDD) scheme transmitted using different times, or may use a frequency division duplex (FDD) scheme transmitted using different frequencies.

In various embodiments, the uplink and downlink may transmit control information through a control channel such as a physical downlink control channel (PDCCH), a physical control format indicator channel (PCFICH), a physical hybrid automatic repeat request (ARQ) indicator channel (PHICH), a physical uplink control channel (PUCCH), or an enhanced physical downlink control channel (EPDCCH) and be configured with a data channel such as a physical downlink shared channel (PDSCH) or a physical uplink shared channel (PUSCH) to transmit data.

Hereinafter, high layer signaling to be described may include RRC signaling for transmitting RRC information including radio resource control (RRC) parameters.

According to various embodiments, converting signal (or information) intensity, displacement, frequency, or phase of signal information to an appropriate waveform shape to correspond to channel characteristics of a transmission medium may be referred to as modulation. Further, converting a digital signal (e.g., digital symbol string) to be transmitted to a signal corresponding to channel characteristics by matching digital information with one of several possible signals (or a set of signals) may be referred to as digital modulation. As a representative digital modulation scheme with good bandwidth efficiency, an M-ary QAM modulation scheme represented in 2MQAM such as quadrature phase shift keying (QPSK) (or quadrature amplitude modulation (4QAM)), 16QAM, 64QAM, and/or 256QAM may be used. According to various embodiments, M is a modulation order, represents the number of digital symbols modulated at one time, and a modulation order of QPSK, 16QAM, 64QAM, and/or 256QAM may include 2, 4, 6, and 8.

A modulation scheme used for downlink data transmission in a wireless communication system (e.g., LTE, 5G new radio (NR)) according to various embodiments may use QPSK, 16QAM, and/or 64QAM based on a first MCS index table or QPSK, 16QAM, 64QAM, and/or 256QAM based on a second MCS index table. According to an embodiment, the base station may select one of three modulation schemes based on the first MCS index table or four modulation schemes based on the second MCS index table in consideration of downlink channel conditions, and may notify the electronic device 101 (or user terminal) of the modulation scheme using the downlink control information (DCI).

FIGS. 2 and 3 are diagrams illustrating an example of an MCS index table used in a wireless communication system according to various embodiments.

According to an embodiment, FIG. 2 illustrates the relationship of a modulation order (Qm) of a first MCS index table 200 including modulation schemes of QPSK 210, 16QAM 220, and 64QAM 230, an MCS index (IMCS), and a TBS index (ITBS), and FIG. 3 may represent the relationship of a modulation order (Qm) of a second MCS index table 300 including a modulation scheme of QPSK 310, 16QAM 320, 64QAM 330, and 256QAM 340, the MCS index (IMCS), and the TBS index (ITBS). Although not illustrated, according to various embodiments, other MCS index tables (not illustrated) including a third MCS index table (not illustrated) including a modulation scheme of QPSK, 16QAM, 64QAM, 256QAM, and 1024QAM, or a high order modulation scheme may also be used.

According to various embodiments, the MCS index of DCI may notify the electronic device 101 of any one of three modulation schemes (e.g., QPSK 210, 16QAM 220, and 64QAM 230), as illustrated in FIG. 2 or may notify the electronic device 101 of any one of four modulation schemes (e.g., QPSK 310, 16QAM 320, 64QAM 330, and 256QAM 340), as illustrated in FIG. 3.

According to an embodiment, referring to FIG. 2, in the case of the first MCS index table 200, MCS index Nos. 0 to 28 (e.g., 210, 220, 230) may be used for hybrid automatic repeat request (HARQ) initial transmission, and MCS index Nos. 29 to 31 (e.g., 240) may be used for HARQ retransmission. For example, in the first MCS index table 200, the QPSK modulation scheme 210 may be used for the MCS index Nos. 0 to 9 (e.g., MCS index corresponding to a modulation order 2), the 16QAM modulation scheme 220 may be used for the MCS index Nos. 10 to 16 (e.g., MCS index corresponding to a modulation order 4), and the 64QAM modulation scheme 230 may be used for the MCS index Nos. 17 to 28 (e.g., MCS index corresponding to a modulation order 6) for downlink data transmission.

According to an embodiment, when MCS index Nos. 0 to 28 (e.g., 210, 220, 230) are used for HARQ initial transmission, MCS index Nos. 29, 30, and 31 (e.g., 240) may be used for distinguishing a modulation scheme used for HARQ retransmission. According to an embodiment, QPSK modulation (e.g., modulation corresponding to a modulation order 2) may be used for the MCS index No. 29, 16QAM modulation (e.g., modulation corresponding to a modulation order 4) may be used for the MCS index No. 30, and 64QAM modulation (e.g., modulation corresponding to a modulation order 6) may be used for the MCS index No. 31 for HARQ retransmission.

In this way, in the existing wireless communication system, QPSK 210, 16QAM 220, and 64QAM 230 are used as modulation schemes. In recent wireless communication systems, in order to further maximize the efficiency of the wireless channel, as a high order modulation scheme, for example, use of 256QAM and/or 1024QAM is required, and accordingly, an additional MCS index table including an MCS index value corresponding to a high order modulation scheme is defined. According to an embodiment, an example of an MCS index table using 256QAM is illustrated in FIG. 3.

According to an embodiment, referring to FIG. 3, in the case of the second MCS index table 300, MCS index Nos. 0 to 27 (e.g., 310, 320, 330, 340) may be used for initial HARQ transmission, and MCS index Nos. 28 to 31 (e.g., 350) may be used for HARQ retransmission. For example, in the second MCS index table 300, the QPSK modulation scheme 310 may be used for MCS index Nos. 0 to 4 (e.g., MCS index corresponding to a modulation order 2), the 16QAM modulation scheme 320 may be used for MCS index Nos. 5 to 10 (e.g., MCS index corresponding to a modulation order 4), the 64QAM modulation scheme 330 may be used for the MCS index Nos. 11 to 19 (e.g., MCS index corresponding to a modulation order 6), and the 256QAM modulation scheme 340 may be used for the MCS index Nos. 20 to 27 (e.g., MCS index corresponding to a modulation order 8) for downlink data transmission.

According to an embodiment, when MCS index Nos. 0 to 27 (e.g., 310, 320, 330, 340) are used for HARQ initial transmission, MCS index Nos. 28, 29, 30, and 31 (e.g., 350) may be used for distinguishing a modulation scheme used for HARQ retransmission. According to an embodiment, QPSK modulation (e.g., modulation corresponding to a modulation order 2) may be used for the MCS index No. 28, 16QAM modulation (e.g., modulation corresponding to a modulation order 4) may be used for the MCS index No. 29, 64QAM modulation (e.g., modulation corresponding to a modulation order 6) may be used for the MCS index No. 30, and 256QAM modulation (e.g., modulation corresponding to a modulation order 8) may be used for the MCS index No. 31 for HARQ retransmission.

As in examples of the MCS index tables 200 and 300 of FIGS. 2 and 3, there are multiple MCS indexes for the same modulation scheme, and each MCS index may transmit data using codewords of different code rates. According to an embodiment, when the channel condition is good, the base station may increase bandwidth efficiency using a high MCS index, and when the channel condition is not good, the base station may perform robust transmission using a low MCS index so as to overcome the channel condition. In this way, a method of adjusting the MCS according to the channel condition is referred to as link adaptation. For example, link adaptation may mean adjusting an MCS so as to maximize system throughput by compensating for a radio channel characteristic that changes over time.

Referring to FIGS. 2 and 3, a transport block size (TBS) index (ITBS) may be configured to correspond to each MCS index (IMCS). According to an embodiment, in a standard (e.g., 3GPP TS 36.213), in consideration that a size of a transmission resource may be allocated to the electronic device 101 (or user terminal) from one physical resource block (PRB) pair to 110 PRB pairs, a TBS, which is the size of 110 transmittable information bits, is defined for each TBS index (ITBS).

FIG. 4 is a diagram illustrating an example of a CQI index table used in a wireless communication system according to various embodiments.

Referring to FIG. 4, in order for the base station to perform link adaptation according to a channel condition of the electronic device 101, the electronic device 101 may need to feed back the channel condition to the base station. According to an embodiment, channel information that the electronic device 101 measures a channel state and feeds back to the base station is referred to as channel state information (CSI), and the CSI may include a pre-coding matrix indicator (PMI), a rank indicator (RI), and a channel quality indicator (CQI). In one embodiment, the PMI and the RI represent CSI related to multiple-input multiple-output (MIMO) transmission, and the CQI may represent a modulation scheme, a code rate value (e.g., code rate*1024), and transmission efficiency (efficiency=modulation order*code rate value) that can be used according to the channel condition of the electronic device 101, as illustrated in FIG. 4. According to an embodiment, the CSI may be generated by measuring a reference signal or data received by the electronic device 101 from the base station.

According to an embodiment, the electronic device 101 may feed back a CQI index having high transmission efficiency to the base station when the channel condition is good, and feed back a low CQI index to the base station when the channel condition is poor. According to an embodiment, the CQI is a value representing a quality of a current downlink channel, is reported (or transmitted) from the electronic device 101 to the base station, and may represent that the higher the channel quality, the better the quality, as illustrated in FIG. 4.

As described above, in recent wireless communication systems, while a 256QAM modulation scheme or high order modulation scheme (e.g., 1024QAM) is supported, in addition to the first MCS index table 200 (e.g., 64QAM MCS index table (e.g., 3GPP LTE Table 7.1.7.1-1)), as illustrated in FIG. 2, the second MCS index table 300 (e.g., 256QAM MCS index table (e.g., 3GPP LTE Table 7.1.7.1-1A)), as illustrated in FIG. 3 was added. According to an embodiment, the electronic device 101 may notify the base station of whether the electronic device 101 supports downlink 256QAM (e.g., DL 256QAM) using a capability information (CI) message, and the base station may notify the electronic device 101 of whether the base station supports downlink 256QAM (e.g., DL 256QAM) through whether the 256QAM MCS index table is used using an RRC connection reconfiguration message.

According to an embodiment, when the MCS index table is determined, the base station may transmit the MCS index to be used in the modulation scheme to the electronic device 101 through the MCS field in the DCI included in the downlink data format. Therefore, if different MCS index tables are used when establishing a connection between the base station and the electronic device 101 (e.g., initial cell search procedure), all of data (e.g., PDSCH packet) transmitted to the electronic device 101 may fail to demodulate. Accordingly, in various embodiments, by using different MCS index tables between the base station and the electronic device 101, if the MCS index tables are mismatched, the electronic device 101 detects this, and by recovering a mismatch in the MCS index tables (or matching the MCS index tables) by the base station or the electronic device 101, a normal service can be enabled.

Figure 5:
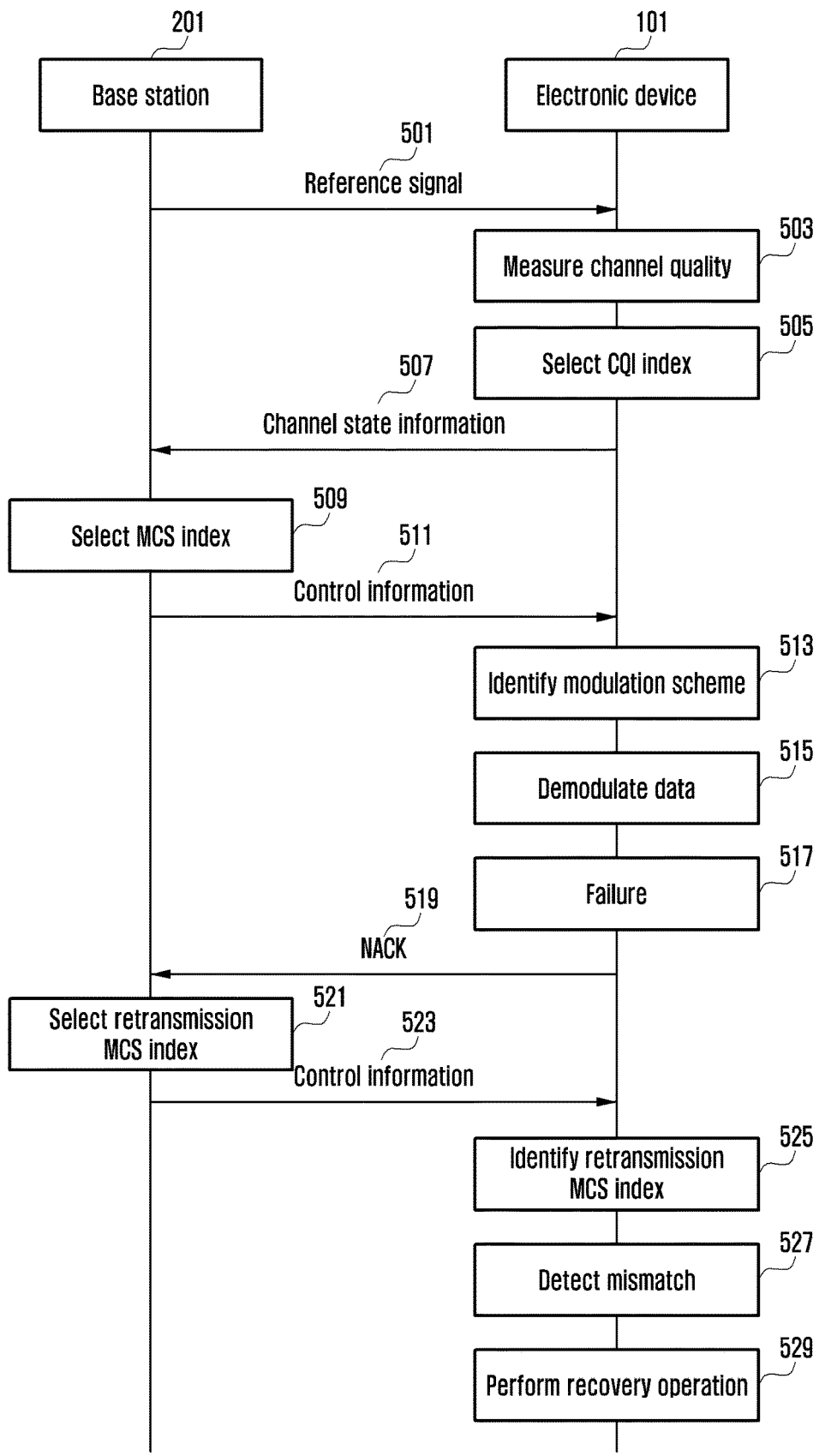
FIG. 5 is a signal flow diagram illustrating operations of an electronic device and a base station according to various embodiments.

FIG. 5 is a signal flow diagram illustrating operations of an electronic device and a base station according to various embodiments.

Referring to FIG. 5, in operation 501, a base station 201 may transmit a reference signal to an electronic device 101 (or user terminal). For example, in order to transmit downlink data (DL data) to the electronic device 101, the base station 201 needs to identify information on downlink channel characteristics of the base station 201 and the electronic device 101. To this end, the base station 201 may generate and transmit a reference signal for measuring downlink channel characteristics to the electronic device 101. According to an embodiment, the reference signal may include a signal for measuring downlink channel characteristics.

In operation 503, the electronic device 101 may receive a reference signal from the base station 201 and measure a channel quality. According to an embodiment, the electronic device 101 may measure the channel quality of a downlink channel.

In operation 505, the electronic device 101 may select a CQI index (or index value) corresponding to the channel quality measurement result using a CQI index table. According to an embodiment, the electronic device 101 may measure a quality of a downlink channel based on a reference signal transmitted by the base station 201 and select channel quality indication information (or CQI) corresponding to the quality.

In operation 507, the electronic device 101 may include the selected CQI index in the CSI to transmit the CSI to the base station 201. According to an embodiment, the CSI may include a PMI, RI, and CQI.

In operation 509, the base station 201 may receive CSI from the electronic device 101 and select an MCS index based on a CQI index included in the CSI. For example, the base station 201 may determine a resource allocation amount for the electronic device 101 using the received CSI, and determine a modulation scheme (e.g., MCS) suitable for the channel characteristics to transmit downlink data to the electronic device 101. According to an embodiment, the base station 201 may receive CSI from the electronic device 101 to identify a CQI index included in the CSI. Thereafter, the base station 201 may select an MCS index of a specific modulation scheme (e.g., QPSK, 16QAM, 64QAM, or 256QAM) corresponding to the identified CQI index. For example, the base station 201 may select any one MCS index (or Index value) from a preconfigured MCS index table (e.g., the first MCS index table 200 of FIG. 2 or the second MCS index table 300 of FIG. 3).

In operation 511, the base station 201 may transmit DCI including the selected MCS index to the electronic device 101.

In operation 513, the electronic device 101 may receive DCI from the base station 201 to identify a modulation scheme for downlink data according to the selected MCS index. According to an embodiment, the electronic device 101 may identify the modulation scheme corresponding to the MCS index received from the base station 201 in a preconfigured MCS index table (e.g., the first MCS index table 200 of FIG. 2 or the second MCS index table 300 of FIG. 3).

In operation 515, the electronic device 101 may demodulate downlink data based on the identified modulation scheme. According to an embodiment, the base station 201 may modulate downlink data according to a modulation scheme included in the DCI and transmit the modulated downlink data to the electronic device 101, and the electronic device 101 may identify a modulation scheme of downlink data according to the MCS index identified in operation 513 to demodulate downlink data.

In operation 517, the electronic device 101 may fail to demodulate downlink data. According to an embodiment, when selecting the MCS index in operation 509, the base station 201 may select an MCS index corresponding to a CQI index in the second MCS index (e.g., the second MCS index table 300 of FIG. 3) including 256QAM not the first MCS index table (e.g., the first MCS index table 200 of FIG. 2). However, in operation 513, when identifying the modulation scheme, the electronic device 101 may identify a modulation scheme corresponding to the MCS index received in the first MCS index table (e.g., the first MCS index table 200 of FIG. 2) that does not include 256QAM not the second MCS index table (e.g., the second MCS index table 300 of FIG. 3).

According to another embodiment, in operation 509, when selecting the MCS index, the base station 201 may select an MCS index corresponding to the CQI index in the first MCS index table (e.g., the first MCS index table 200 of FIG. 2) not the second MCS index table (e.g., the second MCS index table 300 of FIG. 3). However, when identifying the modulation scheme in operation 513, the electronic device 101 may identify a modulation scheme corresponding to the MCS index received in the second MCS index table (e.g., the second MCS index table 300 of FIG. 3) not the first MCS index table (e.g., the first MCS index table 200 of FIG. 2). For example, the electronic device 101 may identify the modulation scheme in other MCS index table not the MCS index table referenced when the base station 201 selects the MCS index. In this case, the electronic device 101 may identify and demodulate an incorrect modulation scheme that does not correspond to the modulation scheme used for modulation of downlink data by the base station 201 to fail to demodulate downlink data.

For example, because of a mismatch in the MCS index tables used (or referenced) between the base station 201 and the electronic device 101, when a demodulation fail (or decoding failure) occurs in the electronic device 101, a cyclic redundancy check (CRC) failure may occur in the case of a corresponding PDSCH block (e.g., first PDSCH block). Accordingly, when different MCS index tables are continuously used between the electronic device 101 and the base station 201, all data (e.g., PDSCH packets) transmitted to the electronic device 101 may fail to demodulate. Accordingly, there is required a method in which the electronic device 101 detects whether the MCS index tables are mismatched and matches (or recovers) the MCS index table including the MCS index referenced by the base station 201 and the MCS index table referenced by the electronic device 101. In various embodiments, an operation example of a mismatch in the MCS index tables between the base station 201 and the electronic device 101 will be described with reference to FIGS. 7 and 8 to be described later.

In operation 519, the electronic device 101 may transmit a NACK according to a failure in demodulation of downlink data to the base station 201.

In operation 521, when the base station 201 receives a NACK related to a failure in demodulation of downlink data from the electronic device 101, the base station 201 may select any one of the MCS index (e.g., retransmission MCS index) used for retransmission in the MCS index table. According to an embodiment, the base station 201 may select an MCS index corresponding to a modulation scheme (e.g., QPSK, 16QAM, 64QAM, or 256QAM) of the MCS index used (or selected) for initial transmission in operation 509 among MCS indexes used for retransmission of the MCS index table referenced when selecting the MCS index in operation 509.

For example, when the MCS index table referenced in operation 509 is the first MCS index table (e.g., the first MCS index table 200 of FIG. 2) that does not include 256QAM, the base station 201 may select an MCS index No. 29, MCS index No. 30, or MCS index No. 31 corresponding to a QPSK modulation scheme, 16QAM modulation scheme, or 64QAM modulation scheme from the first MCS index table and use the MCS index No. 29, MCS index No. 30, or MCS index No. 31 for retransmission. For another example, when the MCS index table referenced by the base station 201 in operation 509 is a second MCS index table (e.g., the second MCS index table 300 of FIG. 3) including 256QAM, the base station 201 may select an MCS index No. 27, MCS index No. 29, MCS index No. 30, or MCS index No. 31 corresponding to the QPSK modulation scheme, 16QAM modulation scheme, 64QAM modulation scheme, or 256QAM modulation scheme from the second MCS index table and use the MCS index No. 27, MCS index No. 29, MCS index No. 30, or MCS index No. 31 for retransmission.

In operation 523, the base station 201 may retransmit DCI including the selected MCS index to the electronic device 101. According to an embodiment, the base station 201 may include and retransmit a retransmission MCS index corresponding to a modulation scheme used for initial transmission among MCS indexes (hereinafter, referred to as a "retransmission MCS index") for retransmission (or used for retransmission) in the MCS index table referenced for initial transmission in the DCI.

In operation 525, the electronic device 101 may receive DCI from the base station 201 to identify the retransmission MCS index. According to an embodiment, when receiving DCI, the electronic device 101 may determine a retransmission MCS index for an MCS index corresponding to a modulation scheme identified in an MCS index table (e.g., an MCS index table referenced in operation 513) referenced for initial transmission. According to an embodiment, the electronic device 101 may compare the determined retransmission MCS index (hereinafter, referred to as a "first retransmission MCS index") and the retransmission MCS index (hereinafter, referred to as a "second retransmission MCS index") received through retransmission of the base station 201 to determine whether the first retransmission MCS index and the second retransmission MCS index match.

In operation 527, the electronic device 101 may detect a mismatch in the MCS index tables based on a result of identifying the retransmission MCS index in operation 527. According to an embodiment, when DCI (e.g., PDSCH packet) is retransmitted, if the first retransmission MCS index and the second retransmission MCS index are different, the electronic device 101 may determine that different MCS index tables are used between the base station 201 and the electronic device 101. For example, the electronic device 101 may detect a mismatch in the MCS index tables used by the base station 201 and the electronic device 101.

In operation 529, the electronic device 101 may perform a configured recovery operation based on detecting a mismatch in the MCS index tables. According to an embodiment, the electronic device 101 may perform a recovery operation for matching the MCS index table used between the base station 201 and the electronic device 101. A recovery operation according to various embodiments will be described with reference to FIGS. 9 and 10 to be described later.

The electronic device 101 according to various embodiments may include at least one communication circuit (e.g., the wireless communication module 192 of FIG. 1) configured to support wireless communication with a base station (e.g., the base station 201 of FIG. 5), a memory (e.g., the memory 130 of FIG. 1) for storing at least two modulation and coding scheme (MCS) index tables (e.g., the first MCS index table 700 of FIG. 7 and the second MCS index table 800 of FIG. 8), and a processor (e.g., the processor 120 of FIG. 1) operatively connected to the communication circuit 192 and the memory 130, and when a cyclic redundancy check (CRC) failure occurs, the processor 120 may receive DCI retransmitted from the base station 201 including a retransmission MCS index using the communication circuit 192, compare the retransmission MCS index with the retransmission MCS index stored in the memory 130 based on the retransmission MCS index of the DCI, determine a mismatch in the MCS index tables based on determination that the retransmission MCS indexes are different, and recover the MCS index table based on determination of the mismatch in the MCS index tables.

According to various embodiments, the processor 120 may transmit CSI to the base station 201, receive, from the base station 201, transmitted DCI including an MCS index selected by the base station 201 based on the CSI, identify modulation information on downlink data based on the MCS index, perform data demodulation with reference to the modulation information, transmit a NACK according to the demodulation failure of downlink data to the base station 201, when the data demodulation fails, and receive the retransmitted DCI including the retransmission MCS index corresponding to a modulation scheme of the MCS index selected for initial transmission from the base station 201.

According to various embodiments, when receiving the retransmitted DCI, the processor 120 may compare a first retransmission MCS index for the MCS index used in the MCS index table referenced for initial transmission by the electronic device 101 and a second retransmission MCS index received through retransmission of the base station 201.

According to various embodiments, the processor 120 may determine whether the first retransmission MCS index and the second retransmission MCS index match, and determine that different MCS index tables are used between the base station 201 and the electronic device 101 based on that the first retransmission MCS index and the second retransmission MCS index are different.

According to various embodiments, when DCI is retransmitted from the base station 201, the processor 120 may determine whether the first retransmission MCS index and the second retransmission MCS index match.

According to various embodiments, the processor 120 may process a next packet based on MCS index tables that match each other between the electronic device 101 and the base station 201 according to the recovery of the MCS index table.

According to various embodiments, when the first retransmission MCS index and the second retransmission MCS index are the same, the processor 120 may process a next packet based on an MCS index table referenced for initial transmission by the electronic device 101.

According to various embodiments, the processor 120 may perform recovery based on at least one operation of recovery by radio resource control (RRC) connection, recovery by transmission of error information, or recovery by the MCS index table change based on detection of a mismatch in the MCS index tables.

According to various embodiments, the processor 120 may attempt demodulation based on at least one other MCS index table based on detecting a mismatch in the MCS index tables used between the base station 201 and the electronic device 101, determine whether a demodulation attempt is successful based on the other MCS index table, perform a configured first recovery operation for matching MCS index tables used between the electronic device 101 and the base station 201, if the demodulation attempt is successful, and perform a configured second recovery operation for matching the MCS index table used between the electronic device 101 and the base station 201, if the demodulation attempt fails.

According to various embodiments, the first recovery operation may include an operation of changing an MCS index table used for initial transmission by the electronic device 101 to another MCS index table in which the demodulation attempt is successful, and the second recovery operation may include an operation of restoring an RRC connection, or reporting a mismatch in the MCS index tables to the base station 201 to request the base station 201 to change the MCS index table.

According to various embodiments, the at least two MCS index tables may include a first MCS index table (e.g., the first MCS index table 200 of FIG. 2) including 64 quadrature amplitude modulation (64QAM), and a second MCS index table (e.g., the second MCS index table 300 of FIG. 3) including 256QAM.

Hereinafter, a method of operating the electronic device 101 according to various embodiments will be described in detail. According to various embodiments, operations performed by the electronic device 101 described below may be executed by at least one processor (e.g., the processor 120 of FIG. 1 as at least one processor including a processing circuit) (hereinafter, referred to as a "processor 120") of the electronic device 101. According to an embodiment, operations performed by the electronic device 101 may be stored in a memory (e.g., the memory 130 of FIG. 1) (hereinafter, referred to as a "memory 130"), and when executed, the operations may be executed by instructions that enable the processor 120 to operate.

Figure 6:
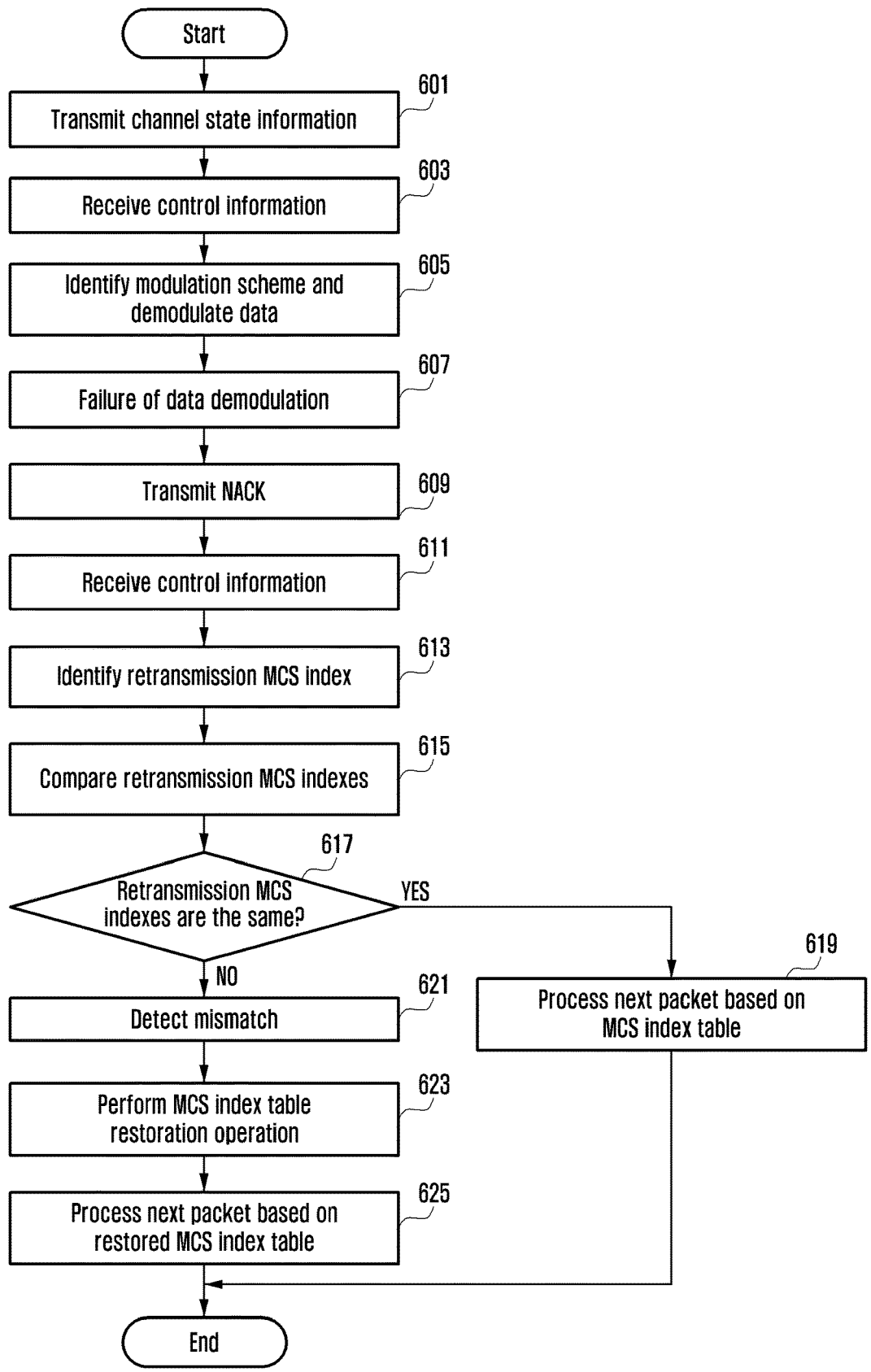
FIG. 6 is a flowchart illustrating a method of operating an electronic device according to various embodiments.

FIG. 6 is a flowchart illustrating a method of operating an electronic device according to various embodiments.

Referring to FIG. 6, in operation 601, the processor 120 of the electronic device 101 may transmit CSI to the base station 201 using a communication circuit (e.g., the wireless communication module 192 of FIG. 1). According to an embodiment, the processor 120 may transmit CSI including information (e.g., CQI index) measuring a channel quality state to the base station 201. According to an embodiment, the CSI may include information on a result of measuring the channel quality of a downlink channel by the electronic device 101 based on a reference signal transmitted by the base station 201. For example, the processor 101 may receive a reference signal for channel measurement from the base station 201, analyze the received reference preference, and measure a channel quality of the downlink channel. Thereafter, the processor 101 may select a preconfigured CQI index (or index value) according to the channel quality result, include the CQI index (or index value) in the CSI, and transmit the CSI to the base station 201.

In operation 603, the processor 120 may receive control information from the base station 201 using the communication circuit 192. According to an embodiment, the processor 120 may receive DCI (DCI) including the MCS index selected by the base station 201 based on the CSI in the MCS index table from the base station 201. According to an embodiment, the DCI includes an MCS index indicating a modulation scheme, and the MCS index may be a value selected by the base station 201 based on the CQI index of the electronic device 101. According to an embodiment, the MCS index is a value selected in a specific MCS index table (e.g., the first MCS index table 200 of FIG. 2 or the second MCS index table 300 of FIG. 3) previously stored in the electronic device 101 and the base station 201, and may include information on a modulation scheme of downlink data. For example, as described above, the MCS index may include information on a modulation order and information on transmission efficiency.

In operation 605, the processor 120 may identify a modulation scheme and perform data demodulation in a demodulation scheme corresponding to the modulation scheme. According to an embodiment, the processor 120 may identify modulation information on downlink data based on the MCS index. For example, the processor 120 may identify information on the modulation scheme based on the MCS index included in the DCI received through the communication circuit 192. Thereafter, in demodulating the received downlink data, the processor 120 may perform data demodulation with reference to the modulation order indicated by the MCS index included in the DCI.

In operation 607, the processor 120 may detect a failure of data demodulation. According to an embodiment, the processor 120 may select an MCS index corresponding to a CQI index in a specific MCS index table, and identify the modulation scheme corresponding to a MCS index received from an MCS index table different from the specific MCS index table referenced by the base station 201. For example, the processor 120 may identify a modulation scheme in another index table (e.g., the second MCS index table 300 of FIG. 3 including a 256QAM modulation scheme) not the MCS index table (e.g., the first MCS index table 200 of FIG. 2 that does not include a 256QAM modulation scheme) referenced when the base station 201 selects the MCS index. In this case, as the processor 120 enables the base station 201 to identify and demodulate an incorrect modulation scheme that does not correspond to the modulation scheme used for modulation of downlink data, the processor 120 may fail to demodulate downlink data. For example, because of a mismatch in the MCS index tables used (or referenced) between the base station 201 and the electronic device 101, a demodulation fail (or decoding fail) may occur in the electronic device 101, and in the case of corresponding data (e.g., PDSCH packet), a CRC failure may occur.

In operation 609, the processor 120 may transmit, to the base station 201, a NACK according to a failure in demodulation of downlink data using the communication circuit 192.

In operation 611, the processor 120 may receive control information from the base station 201 using the communication circuit 192. According to an embodiment, when receiving a NACK related to a failure in demodulation of downlink data from the electronic device 101, the base station 201 may select a retransmission MCS index corresponding to the modulation scheme (e.g., QPSK, 16QAM, 64QAM, or 256QAM) of the MCS index selected for initial transmission among MCS indexes used for retransmission in a specific MCS index table referenced for initial transmission, and include the selected retransmission MCS index in DCI and retransmit the DCI to the electronic device 101.

According to an embodiment, the processor 120 may receive DCI including a retransmission MCS index from the base station 201.

In operation 613, the processor 120 may receive DCI from the base station 201 and identify the retransmission MCS index.

In operation 615, the processor 120 may compare the retransmission MCS indexes. According to an embodiment, when the processor 120 receives the DCI, the electronic device 101 may identify the retransmission MCS index for the MCS index corresponding to the modulation scheme identified (or used) in the MCS index table referenced for initial transmission (e.g., the MCS index table referenced in operation 605). According to an embodiment, the processor 120 may compare the determined retransmission MCS index (hereinafter, referred to as a "first retransmission MCS index") and the retransmission MCS index (hereinafter, referred to as a "second retransmission MCS index") received through retransmission of the base station 201.

In operation 617, the processor 120 may determine whether the first retransmission MCS index and the second retransmission MCS index are the same based on the comparison result.

In operation 617, if the first retransmission MCS index and the second retransmission MCS index are the same (e.g., "Yes" in operation 617), in operation 619, the processor 120 may process a next packet based on the MCS index table referenced for initial transmission.

In operation 617, if the first retransmission MCS index and the second retransmission MCS index are not the same (e.g., "No" in operation 617), in operation 621, the processor 120 may detect (or determine) a mismatch in the MCS index tables. According to an embodiment, when the DCI (e.g., PDSCH packet) is retransmitted, if the first retransmission MCS index and the second retransmission MCS index are different, the processor 120 may determine that the base station 201 and the electronic device 101 use different MCS index tables. For example, the electronic device 101 may detect a mismatch in the MCS index tables used by the base station 201 and the electronic device 101.

In operation 623, the processor 120 may perform an MCS index table restoration operation configured to restore the MCS index table based on detecting a mismatch in the MCS index tables. According to an embodiment, the processor 120 may perform a recovery operation for matching the MCS index table used between the base station 201 and the electronic device 101. A recovery operation according to various embodiments will be described with reference to FIGS. 9 and 10 to be described later.

In operation 625, the processor 120 may process a next packet based on the restored MCS index table. According to an embodiment, the processor 120 may process the next packet based on the MCS index table matched between the electronic device 101 and the base station 201 according to the recovery operation.

FIGS. 7 and 8 are diagrams illustrating an example of an operation of detecting a mismatch in MCS index tables in an electronic device according to various embodiments.

As illustrated in FIGS. 7 and 8, the electronic device 101 may store at least two MCS index tables (e.g., a first MCS index table 700 of FIG. 7 and a second MCS index table 800 of FIG. 8).

Referring to FIG. 7 according to an embodiment, the first MCS index table 700 may include 10 MCS index values (e.g., MCS index Nos. 0 to 9) corresponding to a QPSK modulation scheme, 7 MCS index values (e.g., MCS index Nos. 10 to 16) corresponding to 16QAM modulation scheme, and 12 MCS index values (e.g., MCS index Nos. 17 to 28) corresponding to 64QAM modulation scheme. For example, the first MCS index table 700 may include total 29 MCS index values for initial transmission. Further, the first MCS index table 700 may include three MCS index values (e.g., MCS index Nos. 29 to 31) for retransmission. For example, 29 MCS index values (e.g., MCS index Nos. 0 to 28) for initial transmission and 3 MCS index values (e.g., MCS index Nos. 29 to 31) for retransmission may be assigned to the first MCS index table 700. According to an embodiment, in the first MCS index table 700, one MCS index value may be allocated to each of modulation orders 2, 4, and 6 in the case of retransmission, and one of MCS index values corresponding to the 64QAM modulation scheme may be configured to have a maximum modulation order of 6.

Referring to FIG. 8 according to an embodiment, the second MCS index table 800 may include 5 MCS index values (e.g., MCS index Nos. 0 to 4) corresponding to the QPSK modulation scheme, 6 MCS index values (e.g., MCS index Nos. 5 to 10) corresponding to a 16QAM modulation scheme, 9 MCS index values (e.g., MCS index Nos. 11 to 19) corresponding to a 64QAM modulation schemes, and 8 MCS index values (e.g., MCS index Nos. 20 to 27) corresponding to a 256QAM modulation scheme. For example, the second MCS index table 700 may include total 28 MCS index values for initial transmission. Further, the second MCS index table 800 may include four MCS index values (e.g., MCS index Nos. 28 to 31) for retransmission. For example, 28 MCS index values (e.g., MCS index Nos. 0 to 27) for initial transmission and 4 MCS index values (e.g., MCS index Nos. 28 to 31) for retransmission may be assigned to the second MCS index table 800. According to an embodiment, in the second MCS index table 800, one MCS index value may be assigned to each of modulation orders 2, 4, 6, and 8 in the case of retransmission, and one of the MCS index values corresponding to a 256 QAM modulation scheme may be configured to have a maximum modulation order of 8.

According to various embodiments, when a CRC failure occurs in the electronic device 101 because of a mismatch in the MCS index tables used between the base station 201 and the electronic device 101, the electronic device 101 may detect a mismatch in the MCS index tables using different MCS index tables between the base station 201 and the electronic device 101, and recover the MCS index table in the base station 201 or the electronic device 101 based on this.

According to an embodiment, referring to FIGS. 7 and 8, it may be assumed that the base station 201 uses the first MCS index table 700 (e.g., 64QAM MCS index table) illustrated in FIG. 7, and that the electronic device 101 uses the second MCS index table 800 (e.g., 256QAM MCS index table) illustrated in FIG. 8. In this case, in the case of MCS indexes (e.g., MCS index Nos. 0 to 4 (710, 810) in FIGS. 7 and 8, MCS index 10 (720, 820), MCS index Nos. 17 to 19 (730, 830)) illustrated in shades in FIGS. 7 and 8, the MCS indexes for retransmission may be different. In various embodiments, a mismatch using different MCS index tables between the base station 201 and the electronic device 101 may be detected based on at least one MCS index having different MCS indexes for retransmission in the MCS index table when a CRC fails.

According to an embodiment, when the base station 201 transmits using the MCS index No. 4 in the first MCS index table 700, the modulation order may correspond to 2 and the TBS index may correspond to 4. The electronic device 101 may receive DCI including MCS index No. 4 from the base station 201 and demodulate (or decode) the DCI using the second index table 800. In this case, the electronic device 101 attempts the modulation order 2 corresponding to the MCS index No. 4 and demodulation (or decoding) corresponding to the TBS index 8 in the second MCS index table 800, and may fail to demodulate. According to an embodiment, when demodulation fails, the electronic device 101 may transmit a NACK to the base station 201 and request retransmission.

According to an embodiment, the base station 201 may retransmit DCI in response to receiving the NACK from the electronic device 101. According to an embodiment, upon retransmission, the base station 201 may include the MCS index No. 29 in DCI and transmit the DCI. For example, the base station 201 may select the retransmission MCS index No. 29 corresponding to the modulation scheme (e.g., MCS index No. 4 corresponding to QPSK) selected from the first MCS index table 700 referenced for the initial transmission to use the retransmission MCS index No. 29 for retransmission.

According to an embodiment, because the electronic device 101 uses the second MCS index table 800 for initial transmission, when receiving the retransmitted DCI from the base station 201, the electronic device 101 may use the retransmission MCS index No. 28 for the MCS index No. 4 used for initial transmission in the second MCS index table 800. Therefore, when the electronic device 101 receives the MCS index No. 29 retransmitted by the base station 201, the electronic device 101 may determine that the MCS index No. 29 is different from the MCS index No. 28 used for the retransmission, and determine a mismatch in the MCS index tables in which the base station 201 and the electronic device 101 use different MCS index tables.

Figure 9:
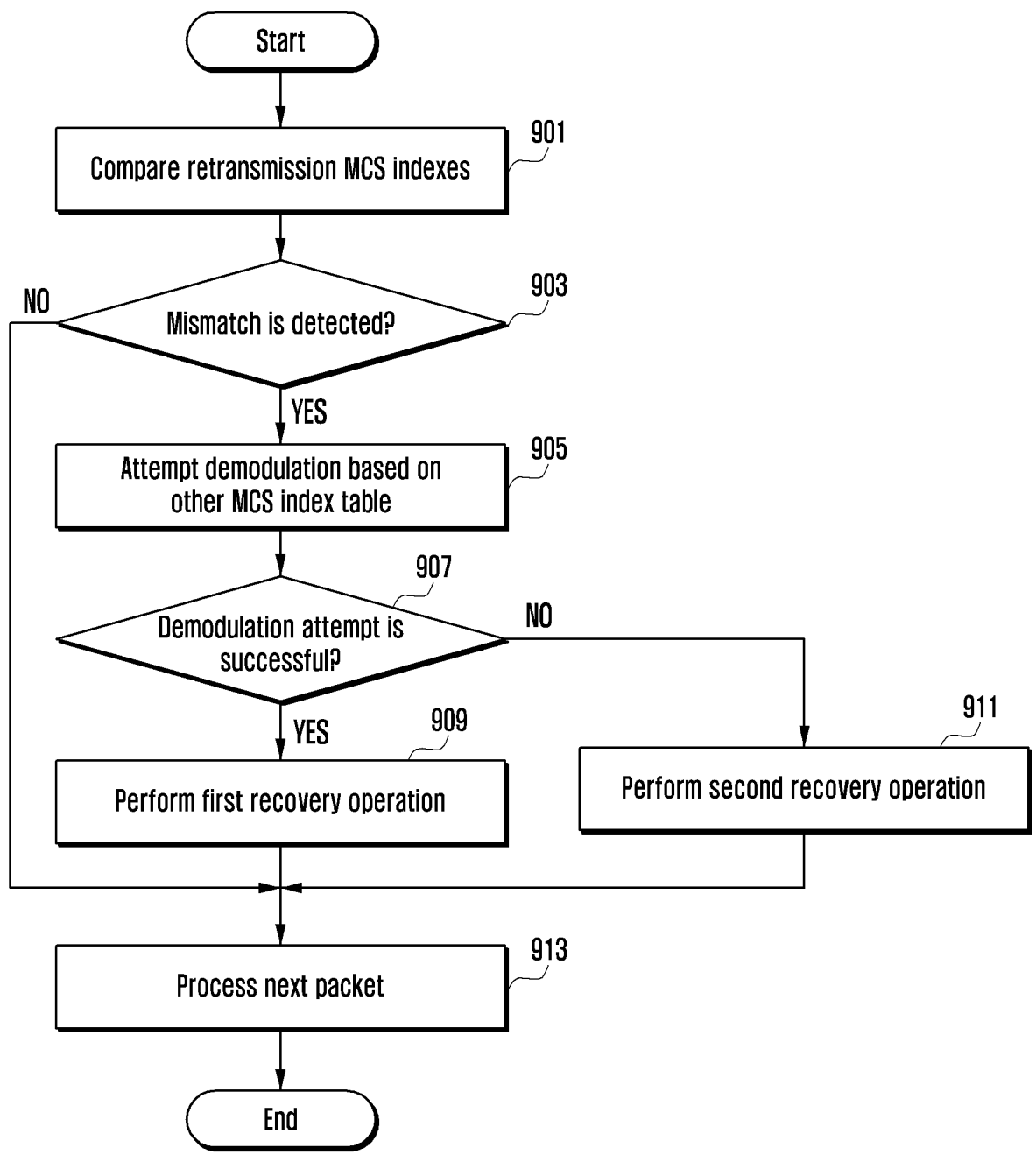
FIG. 9 is a flowchart illustrating a method of operating an electronic device according to various embodiments.

FIG. 9 is a flowchart illustrating a method of operating an electronic device according to various embodiments.

Referring to FIG. 9, in operation 901, the processor 120 of the electronic device 101 may compare retransmission MCS indexes. According to an embodiment, when receiving DCI corresponding to a retransmission request from the base station 201, the processor 120 may compare a retransmission MCS index (hereinafter, referred to as a "first retransmission MCS index") for the MCS index corresponding to a modulation scheme identified (or used) in the MCS index table referenced for initial transmission by the electronic device 101 and a retransmission MCS index (hereinafter, referred to as a "second retransmission MCS index") received through retransmission of the base station 201.

In operation 903, the processor 120 may determine whether a mismatch in the MCS index tables used between the base station 201 and the electronic device 101 is detected based on the comparison result. According to an embodiment, the processor 120 may determine whether the first retransmission MCS index and the second retransmission MCS index match, and when determining that the first retransmission MCS index and the second retransmission MCS index are not the same, the processor 120 may detect (or determine) a mismatch in the MCS index tables. For example, when the DCI is retransmitted, if the first retransmission MCS index and the second retransmission MCS index are different, the processor 120 may determine that different MCS index tables are used between the base station 201 and the electronic device 101.

In operation 903, if a mismatch in the MCS index tables is not detected (e.g., "No" in operation 903), the processor 120 may proceed operation 913, and process a next packet based on the MCS index table used for initial transmission.

In operation 903, if the processor 120 detects a mismatch in the MCS index tables (e.g., "Yes" in operation 903), in operation 905, the processor 120 may attempt demodulation based on at least one other MCS index table. According to an embodiment, the processor 120 may identify information on a modulation scheme corresponding to an MCS index (or retransmission MCS index) referenced for initial transmission in at least one other MCS index table in addition to the MCS index table used for initial transmission and attempt demodulation based on the corresponding modulation scheme. According to an embodiment, when there are a plurality of MCS index tables other than the MCS index table used for initial transmission (e.g., the first MCS index table 700 of FIG. 7 including 64QAM), the processor 120 may sequentially perform a demodulation attempt based on the corresponding modulation scheme in a plurality of other MCS index tables (e.g., the second MCS index table 800 of FIG. 8 including 256QAM and the third MCS index table (not illustrated) including 1024QAM). For example, when a demodulation attempt fails in a first another MCS index table (e.g., the second MCS index table 800 of FIG. 8) of a plurality of other MCS index tables, the processor 120 may attempt demodulation in a second (or next) another MCS index table (e.g., third MCS index table (not illustrated)).

In operation 907, the processor 120 may determine whether a demodulation attempt based on another MCS index table is successful.

In operation 907, if the demodulation attempt is successful (e.g., "Yes" in operation 907), in operation 909, the processor 120 may perform a first recovery operation. For example, the processor 120 may perform at least one recovery operation configured to match the MCS index table used between the electronic device 101 and the base station 201. According to an embodiment, the processor 120 may restore the RRC connection with the base station 201, or report (or transmit) a mismatch in the MCS index tables to the base station 201 to request to change the MCS index table by the base station 201.

In operation 907, if the demodulation attempt fails (e.g., "No" in operation 907), in operation 911, the processor 120 may perform a second recovery operation. For example, the processor 120 may perform at least one recovery operation configured to match the MCS index table used between the electronic device 101 and the base station 201. According to an embodiment, the processor 120 may change a current MCS index table (e.g., an MCS index table used for initial transmission) to another MCS index table (e.g., an MCS index table in which a demodulation attempt is successful).

In various embodiments, the first recovery operation and the second recovery operation may include the same recovery operation or may be different recovery operations. According to an embodiment, when a demodulation attempt based on another MCS index table fails, the processor 120 may determine the failure as a connection error (or network error) with the base station 201 (e.g., worsening in an electric field condition or no-service), and may not perform (or omit) operation 911, and may perform operation 913 to process a next packet.

In operation 913, the processor 120 may process the next packet based on the MCS index table recovered in operation 909 or 911. For example, the processor 120 may process the next packet based on the MCS index table matched between the electronic device 101 and the base station 201.

Figure 10:
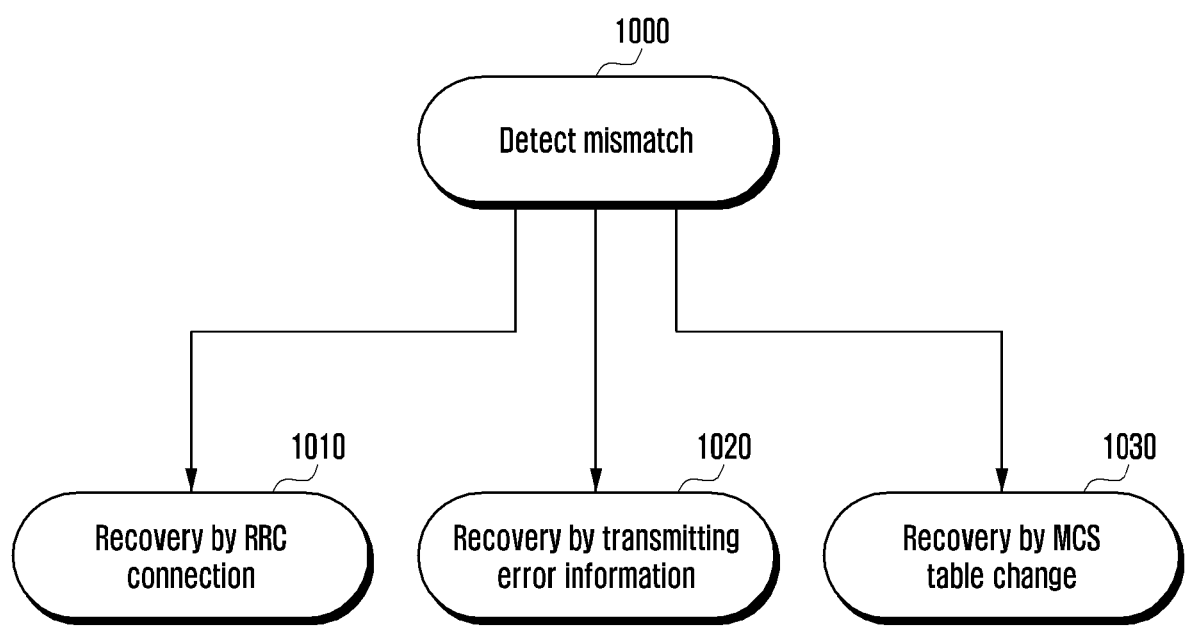
FIG. 10 is a diagram illustrating an operation of recovering a mismatch in MCS index tables in an electronic device according to various embodiments.

FIG. 10 is a diagram illustrating an operation of recovering a mismatch in MCS index tables in an electronic device according to various embodiments.

As illustrated in FIG. 10, when detecting a mismatch in the MCS index tables in block 1000, the electronic device 101 (or the processor 120 of the electronic device 101) may perform a recovery operation corresponding to a block 1010, block 1020, or block 1030.

According to an embodiment, referring to the block 1010, when a mismatch in MCS index tables is detected, the electronic device 101 may perform recovery by RRC connection. According to an embodiment, the electronic device 101 may determine a radio link failure due to a CQI report configuration error, transmit an RRC connection reestablishment request message for reestablishing an RRC connection to the base station 201, and restore the RRC connection from a response of the base station 201. According to an embodiment, according to recovery of the RRC connection, the base station 201 and the electronic device 201 may restart from initial transmission, and use a new MCS index table.

According to an embodiment, referring to the block 1020, when a mismatch in MCS index tables is detected, the electronic device 101 may perform recovery by transmitting error information. According to an embodiment, the electronic device 101 may notify the base station 201 that a mismatch in the MCS index tables is detected, and enable to change the MCS index table by the base station 201. According to an embodiment, the electronic device 101 may include and transmit information on the mismatch in the MCS index tables in a specific MAC control element (MAC-CE) message to enable the base station 201 to determine the mismatch in the MCS index tables.

According to an embodiment, referring to the block 1030, when a mismatch in MCS index tables is detected, the electronic device 101 may change a current MCS index table to another MCS index table and recover the MCS index table. According to an embodiment, the electronic device 101 may restore the MCS index table based on the change of the MCS index table used for initial transmission to another MCS index table stored in the memory 130 of the electronic device 101, as described in the description of operation 909 with reference to FIG. 9.

Figure 11:
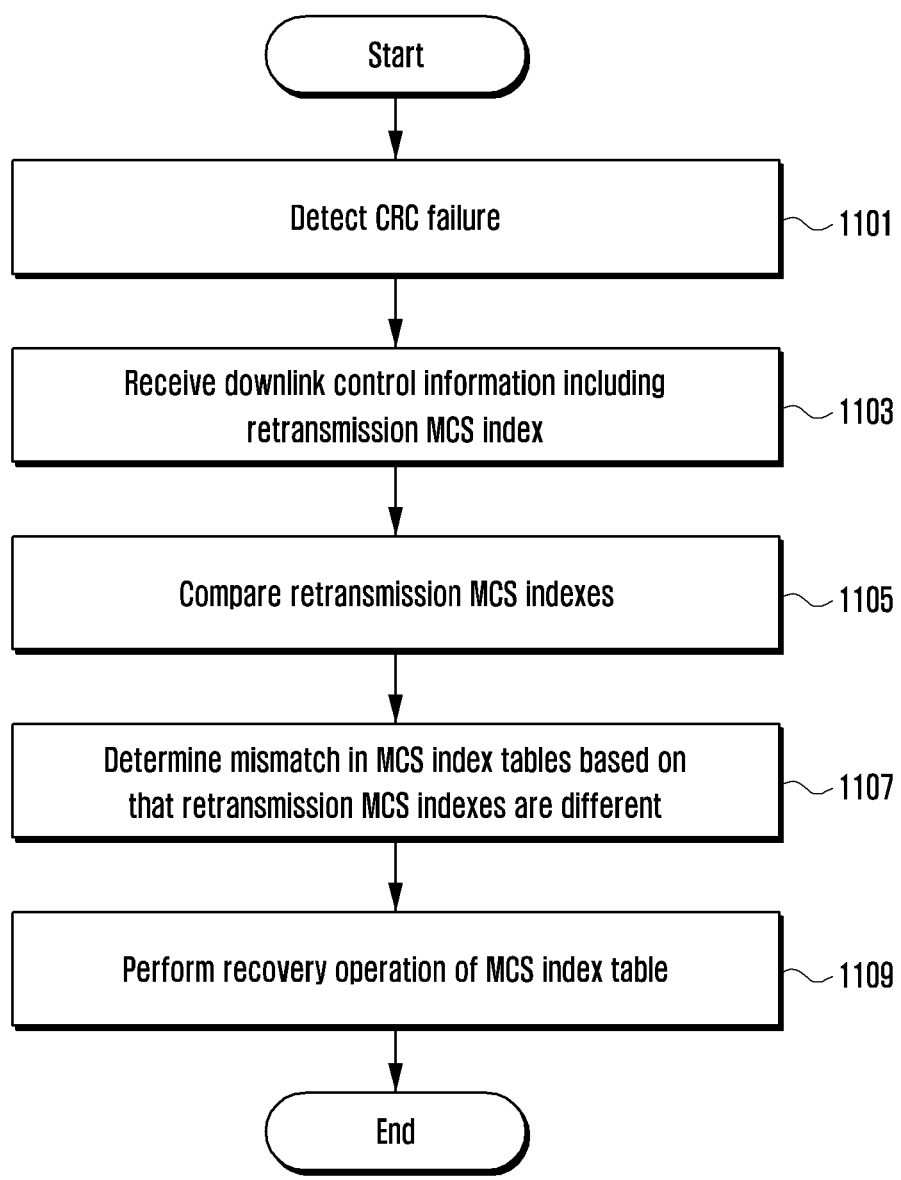
FIG. 11 is a flowchart illustrating a method of operating an electronic device according to various embodiments.

FIG. 11 is a flowchart illustrating a method of operating an electronic device according to various embodiments.

Referring to FIG. 11, in operation 1101, the processor 120 of the electronic device 101 may detect a CRC failure, as described above.

In operation 1103, when a CRC failure occurs, the processor 120 may receive retransmitted DCI including a retransmission MCS index from the base station 201 using the communication circuit 192. According to an embodiment, the processor 120 may transmit a NACK according to a demodulation failure of downlink data to the base station 201 using the communication circuit 192, and receive DCI including an MCS index selected for initial transmission from the base station 201.

In operation 1105, the processor 120 may compare the retransmission MCS index with the retransmission MCS index stored in the memory 130 of the electronic device 101 based on the retransmission MCS index of the DCI. According to an embodiment, when receiving the DCI retransmitted by the base station 201, the processor 120 may compare a retransmission MCS index (hereinafter, referred to as a "first retransmission MCS index") for the MCS index corresponding to a modulation scheme identified (or used) in the MCS index table referenced for initial transmission by the electronic device 101 and a retransmission MCS index (hereinafter, referred to as a "second retransmission MCS index") received through retransmission of the base station 201.

In operation 1107, the processor 120 may determine a mismatch in the MCS index tables based on determination that the retransmission MCS indexes (e.g., the first retransmission MCS index and the second retransmission MCS index) are different (or determination that they are not the same) based on the comparison result. According to an embodiment, when the DCI is retransmitted, if the first retransmission MCS index and the second retransmission MCS index are different, the processor 120 may determine that different MCS indexes are used between the base station 201 and the electronic device 101.

In operation 1109, the processor 120 may perform a configured MCS index table recovery operation based on detecting a mismatch in the MCS index tables. According to an embodiment, the processor 120 may perform a recovery operation for matching the MCS index table used between the base station 201 and the electronic device 101.

The method of operating the electronic device 101 according to various embodiments may include receiving retransmitted DCI (DCI) including a retransmission modulation and coding scheme (MCS) index from the base station (e.g., the base station 201 of FIG. 5) using a communication circuit (e.g., the wireless communication module 192 of FIG. 1) when a cyclic redundancy check (CRC) failure occurs, comparing the retransmission MCS index with the retransmission MCS index stored in the memory (e.g., the memory 130 of FIG. 1) based on the retransmission MCS index of the DCI, determining a mismatch in the MCS index tables based on determining that the retransmission MCS indexes are different, and recovering the MCS index table based on determining the mismatch in the MCS index tables.

According to various embodiments, the operation of receiving the retransmitted DCI may include operations of transmitting CSI to the base station 201, from the base station 201, receiving, from the base station 201, transmitted DCI including the MCS index selected by the base station 201 based on the CSI, identifying modulation information on downlink data based on the MCS index, performing data demodulation with reference to demodulation information, transmitting a NACK according to a demodulation failure of downlink data to the base station 201 when the data demodulation fails, and receiving the retransmitted DCI including the retransmission MCS index corresponding to the modulation scheme of an MCS index selected for initial transmission from the base station 201.

According to various embodiments, the operation of determining a mismatch may include operations of comparing, by the electronic device 101, a first retransmission MCS index for the MCS index used in the MCS index table referenced for initial transmission and a second retransmission MCS index received through retransmission of the base station 201, when receiving the retransmitted DCI.

According to various embodiments, the comparing operation may include operations of determining whether the first retransmission MCS index and the second retransmission MCS index match and determining that different MCS index tables are used between the base station 201 and the electronic device 101 based on that the first retransmission MCS index and the second retransmission MCS index are different.

According to various embodiments, the operation of determining whether the first retransmission MCS index and the second retransmission MCS index match may determine whether the first retransmission MCS index and the second retransmission MCS index match, when the DCI is retransmitted from the base station 201.

According to various embodiments, the method may include operations of processing a next packet based on an MCS index table matched between the electronic device 101 and the base station 201 according to the recovery operation.

According to various embodiments, when the first retransmission MCS index and the second retransmission MCS index are the same, the method may include operation of processing a next packet based on the MCS index table referenced by the electronic device 101 for initial transmission.

According to various embodiments, the recovering operation may be performed based on at least one recovery operation of recovery by radio resource control (RRC) connection, recovery by transmission of error information, or recovery by change of the MCS index table based on detecting a mismatch in MCS index tables.

According to various embodiments, the recovering operation may include operations of attempting demodulation based on at least one other MCS index table based on detecting a mismatch in MCS index tables used between the base station 201 and the electronic device 101, determining whether a demodulation attempt is successful based on the other MCS index table, performing first recovery configured for matching an MCS index table used between the electronic device 101 and the base station 201 when the demodulation attempt is successful, and performing second recovery configured for matching the MCS index table used between the electronic device 101 and the base station 201 when the demodulation attempt fails.

Various embodiments of the disclosure disclosed in the present specification and drawings are provided only to provide specific examples to easily explain the technical content of the disclosure and to aid understanding of the disclosure, and are not intended to limit the scope of the disclosure. Therefore, it should be construed that all changes or modified forms derived based on the technical idea of the disclosure in addition to the embodiments disclosed herein are included in the scope of the disclosure.

The invention claimed is:

1. An electronic device, comprising:
   at least one communication circuit configured to support wireless communication with a base station;
   a memory configured to store at least two modulation and coding scheme (MCS) index tables; and
   a processor operatively connected to the communication circuit and the memory, wherein the processor is configured to:
   receive retransmitted downlink control information (DCI) including a retransmission MCS index from the base station using the communication circuit when a cyclic redundancy check (CRC) failure occurs,
   compare the retransmission MCS index with the retransmission MCS index stored in the memory based on the retransmission MCS index of the DCI,
   determine a mismatch in the MCS index tables based on determining that the retransmission MCS indexes are different, and
   recover the MCS index tables based on determining the mismatch in the MCS index tables.

2. The electronic device of claim 1, wherein the processor is further configured to:
   transmit channel state information (CSI) to the base station,
   receive, from the base station, transmitted DCI including an MCS index selected by the base station based on the CSI,
   identify modulation information on downlink data based on the MCS index, and to perform data demodulation with reference to the modulation information,
   transmit a NACK according to a demodulation failure of downlink data to the base station, when the data demodulation fails, and
   receive, from the base station, retransmitted DCI including the retransmission MCS index corresponding to a modulation scheme of the MCS index selected for initial transmission.

3. The electronic device of claim 1, wherein, when receiving retransmitted DCI, the processor is further configured to:
   compare a first retransmission MCS index for an MCS index used in the MCS index tables referenced by the electronic device for initial transmission and a second retransmission MCS index received through retransmission of the base station.

4. The electronic device of claim 3, wherein the processor is further configured to:
   determine whether the first retransmission MCS index and the second retransmission MCS index match, and
   determine that different MCS index tables are used between the base station and the electronic device based on that the first retransmission MCS index and the second retransmission MCS index are different.

5. The electronic device of claim 4, wherein the processor is further configured to:
   determine whether the first retransmission MCS index and the second retransmission MCS index match, when DCI is retransmitted from the base station.

6. The electronic device of claim 1, wherein the processor is further configured to:
   process a next packet based on the MCS index tables matched with each other between the electronic device and the base station according to recovery of the MCS index tables.

7. The electronic device of claim 3, wherein, when the first retransmission MCS index and the second retransmission MCS index are the same, the processor is further configured to:
   process a next packet based on the MCS index tables referenced for initial transmission by the electronic device.

8. The electronic device of claim 1, wherein the processor is further configured to:
   perform recovery based on at least one recovery operation of recovery by radio resource control (RRC) connection, recovery by transmission of error information, or recovery by change of the MCS index tables, based on detection of a mismatch in the MCS index tables.

9. The electronic device of claim 1, wherein the processor is further configured to:
   attempt demodulation based on at least one other MCS index table, based on detecting a mismatch in the MCS index tables used between the base station and the electronic device,
   determine whether a demodulation attempt based on the other MCS index table is successful,
   perform a first recovery operation configured to match the MCS index tables used between the electronic device and the base station, when the demodulation attempt is successful, and
   perform a second recovery operation configured to match the MCS index tables used between the electronic device and the base station, when the demodulation attempt fails.

10. The electronic device of claim 9,
wherein the first recovery operation includes changing an MCS index tables used by the electronic device for initial transmission to another MCS index tables in which the demodulation attempt is successful, and
wherein the second recovery operation includes restoring an RRC connection or reporting a mismatch in the MCS index tables to the base station to request the base station to change the MCS index tables.

11. A method of operating an electronic device, the method comprising:
receiving, when a cyclic redundancy check (CRC) failure occurs, retransmitted downlink control information (DCI) including a retransmission modulation and coding scheme (MCS) index from a base station using a communication circuit;
comparing the retransmission MCS index with a retransmission MCS index stored in a memory based on the retransmission MCS index of the DCI;
determining a mismatch in MCS index tables based on determining that the retransmission MCS indexes are different; and
restoring the MCS index tables based on determining the mismatch in the MCS index tables.

12. The method of claim 11, wherein the receiving of retransmitted DCI comprises:
transmitting channel state information (CSI) to the base station,
receiving, from the base station, transmitted DCI including an MCS index selected by the base station based on the CSI,
identifying modulation information on downlink data based on the MCS index, and performing data demodulation with reference to the modulation information,
transmitting, when the data demodulation fails, a NACK according to a demodulation failure of downlink data to the base station, and
receiving the retransmitted DCI including the retransmission MCS index corresponding to a modulation scheme of the MCS index selected for initial transmission from the base station.

13. The method of claim 11, wherein the determining of the mismatch comprises:
comparing, when receiving retransmitted DCI, a first retransmission MCS index for an MCS index used in the MCS index tables referenced for initial transmission by the electronic device and a second retransmission MCS index received through retransmission of the base station,
determining that different MCS index tables are used between the base station and the electronic device based on that the first retransmission MCS index and the second retransmission MCS index are different, and
processing, when the first retransmission MCS index and the second retransmission MCS index are the same, a next packet based on the MCS index tables referenced for initial transmission by the electronic device.

14. The method of claim 11, further comprising:
processing a next packet based on the MCS index tables matched with each other between the electronic device and the base station according to a recovery operation.

15. The method of claim 11, wherein the restoring of the MCS index tables is performed based on at least one recovery operation of recovery by radio resource control (RRC) connection, recovery by transmission of error information, or recovery by change of the MCS index tables based on detecting a mismatch in the MCS index tables.

* * * * *